United States Patent [19]

Dorschner

[11] Patent Number: 4,818,087
[45] Date of Patent: Apr. 4, 1989

[54] ORTHOHEDRAL RING LASER GYRO

[75] Inventor: Terry A. Dorschner, Newton Centre, Mass.

[73] Assignee: Raytheon Company, Lexington, Mass.

[21] Appl. No.: 412,459

[22] Filed: Aug. 27, 1982

[51] Int. Cl.$^4$ ............................................. G02B 5/08
[52] U.S. Cl. .................................... 350/622; 350/400; 356/350; 372/94
[58] Field of Search .......................... 372/94; 356/350; 350/622, 400

[56] References Cited

U.S. PATENT DOCUMENTS

| | | | |
|---|---|---|---|
| 3,484,721 | 12/1969 | Bond et al. | 372/94 |
| 3,930,731 | 1/1976 | Andringa | 356/350 |
| 3,982,204 | 9/1976 | Andringa | 356/350 |
| 4,110,045 | 8/1978 | Smith et al. | 372/94 |
| 4,222,668 | 9/1980 | Henry | 356/350 |
| 4,247,832 | 1/1981 | Sanders et al. | |
| 4,305,046 | 12/1981 | Floch et al. | 356/350 |
| 4,317,089 | 2/1982 | Grant, Jr. et al. | 372/94 |
| 4,397,027 | 8/1983 | Zampiello et al. | 372/94 |
| 4,477,188 | 10/1984 | Stiles et al. | 372/94 |
| 4,616,929 | 10/1986 | Bernelin et al. | 372/94 |

OTHER PUBLICATIONS

Technical Report AFWAL-TR-80-1174, "Ring Laser Gyro Technology for Advanced Aircraft Navigation (Phase II)", J. B. Matthews et al.; Raytheon Company, Nov. 1980; pp. 136-149.

DTIC Technical Abstract Bulletin No. 81-18; 8/28/81; No. AD-B952 517; p. 35.
IEEE CH1449-3/79 "Properties of a Zeeman Multioscillator Ring Laser Gyro", V. Sanders, S. Madan, W. Chow and M. Scully, pp. 2-6.

Primary Examiner—Stephen C. Buczinski
Attorney, Agent, or Firm—Christopher L. Maginniss; Richard M. Sharkansky

[57] ABSTRACT

A ring laser gyro uses a nonplanar equilateral (skew rhombus) ring path. In the preferred embodiment, the mirrors used to produce such path are mounted on a supporting cube having passages cut in the path of a beam of electromagnetic energy propagating therebetween. Preferably, the mirrors are positioned on the surface of the cube and produce a nonplanar equilateral ring path having path segments in two planes. In one embodiment, four mirrors are placed on the corners of the cube to define the vertices of a tetrahedron circumscribed by the cube. With such an arrangement, the sensitive axis is along one of the three mutually orthogonal principal axes of the cube. The tetrahedral ring is equiangular as well as equilateral; thus, all the incidence angles on the mirrors are the same. In another embodiment, the orthohedral ring, two mirrors are placed on a first pair of adjacent corners of the cube and two mirrors are placed between the corners of two adjacent corner pairs to provide a path substantially on two of the faces of the cube.

6 Claims, 2 Drawing Sheets

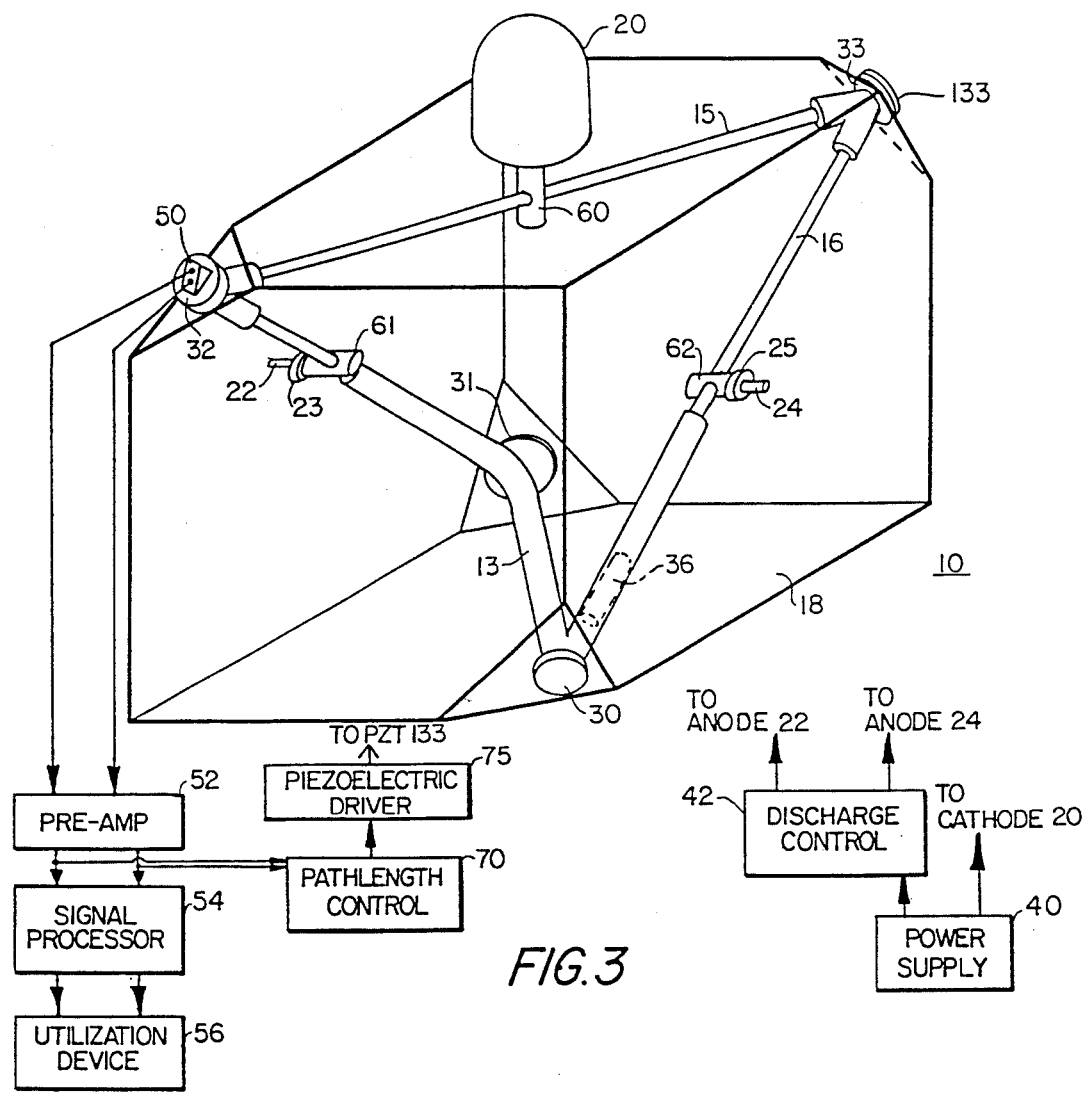
FIG. 3
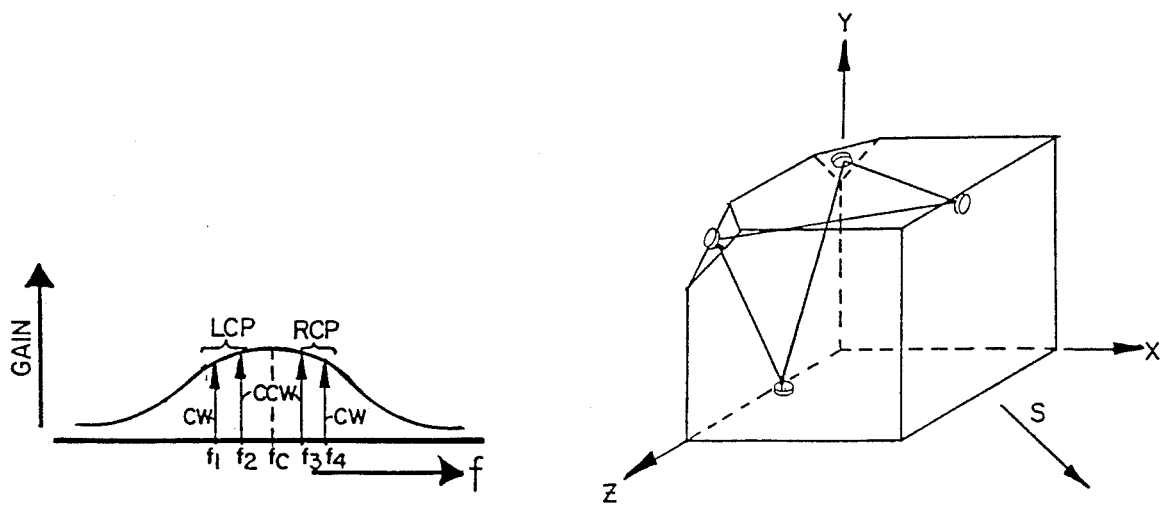
FIG. 4
FIG. 5

ORTHOHEDRAL RING LASER GYRO

BACKGROUND OF THE INVENTION

Nonplanar ring resonators, such as that disclosed in U.S. Pat. No. 4,110,045, issued Aug. 29, 1978 to Smith et al. and assigned to the present assignee, use a block of material having several surfaces cut at predetermined angles to support mirrors for generating a non-planar path having a predetermined amount of image rotation. While such resonators work satisfactorily when used as ring laser gyros, they have one inherent disadvantage in that the resulting shape has been highly nonsymmetrical. This complicates the manufacture of such resonators since the block has to be rotated through a plurality of different angles. Additionally, some of the optical elements in such path, such as mirrors, produce a scatter distribution which varies as a function of beam movement. If the scatter distribution changes as the beam position changes, for example, due to an expansion of the block, such changes introduce a variable amount of drift in the output signal generated to indicate the rotation rate.

SUMMARY OF THE INVENTION

The present invention discloses a ring laser gyro using a nonplanar path which is highly symmetrical. The symmetry improves the ease of fabrication. In applications encountering only a small range of expansion or contraction of the supporting block the symmetry is maintained by using fixed mirrors with no pathlength control thus improving the overall performance due to a concomitant reduction of the scatter variation. For applications requiring pathlength control one of the mirrors is placed on a flexible piezoelectric-driven substrate in order to control its position. The nonplanar path produces a predetermined amount of image rotation which provides reciprocal circular birefringence. This reciprocal circular birefringence together with the nonreciprocal circular birefringence produced by a Faraday rotator produce the frequency splitting of a propagating mode that results in a four-frequency laser gyro. The nonplanar path provided has a plane of mirror symmetry, and preferably four reflectors are used to produce a path in two planes. In one embodiment, the resulting path is equilateral and the two planes are orthogonal to each other.

BRIEF DESCRIPTION OF THE DRAWINGS

The present invention may be better understood with reference to the accompanying drawings wherein:

FIG. 3 shows the embodiment of FIG. 1 using pathlength control;

FIG. 4 shows the mode component distribution useful in understanding the operation of the laser gyro of the present invention; and FIG. 5 shows a second embodiment of the invention using a orthohedral ring.

DESCRIPTION OF THE PREFERRED EMBODIMENT

Figure 1:
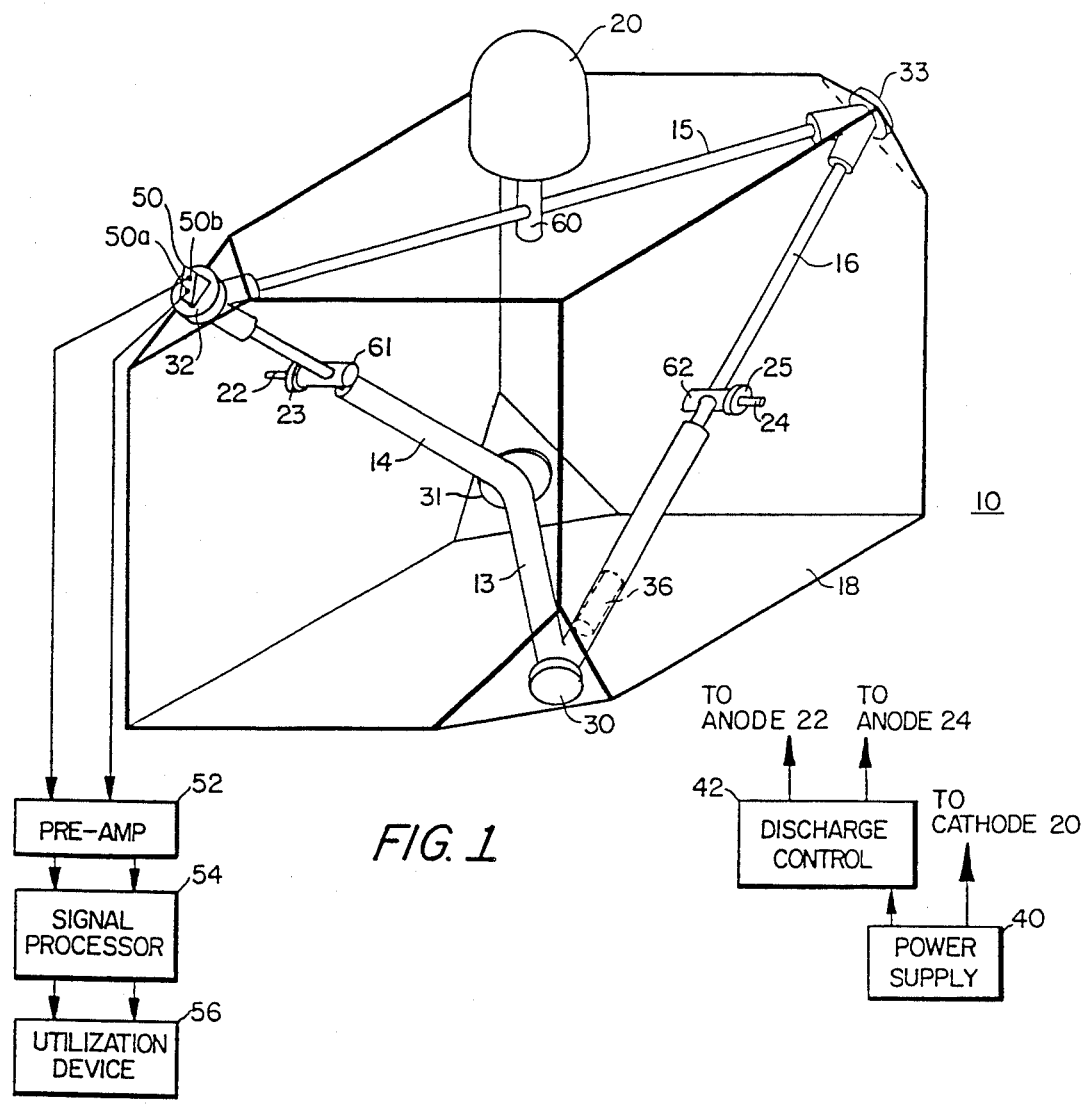
FIG. 1 shows a first embodiment of the laser gyro system of the present invention using a tetrahedral ring.

Referring now to FIG. 1, there is shown the laser gyro system 10 of the present invention. The ring laser gyro nonplanar path is formed by passages 13, 14, 15 and 16 and mirrors 30, 31, 32 and 33, and is shown as path 12 by the heavy lines in FIG. 2. Passages 13, 14, 15 and 16 are drilled in supporting gyro block 18. Mirrors 30, 31, 32 and 33 are located at the corresponding intersections of passages 13 through 16 and are mounted on the planes resulting from cutting off corners of block 18. The intersection of the centerlines of any two adjacent passages lie in a corresponding one of these planes. The aforesaid intersection points form the vertices of a regular tetrahedron, resulting in a ring path which is equiangular as well as equilateral. The planes where the mirrors are mounted are each perpendicular to a corresponding plane of incidence defined by any two adjacent passages in block 18. Stated alternatively, the normal of the plane of each cut portion bisects the angle formed by the two passages incident thereon. Mirrors 30 through 33 comprise dielectric stacks of alternating layers of high and low dielectric constant deposited on polished substrates to form a reflector at the operative wavelength, as is known in the art. Preferably, one of the mirrors, such as mirror 30, is spherical in order to control the mode size of the beams circulating in the ring path 12, as is known in the art. Gyro block 18 is a cubic block of low expansion material such as a machinable glass-ceramic material commercially available as Zerodur by Schott Optical Company.

Passages 13 through 16 are filled with a gain medium suitable for laser operation, such as a mixture of helium and neon for operation at the 0.6328 micrometer wavelength. A laser beam is produced by an electrical discharge generated between cathode 20 and anodes 22 and 24 by power supply 40 and discharge control 42. The cathode is connected directly to the negative electrode of power supply 40, while anodes 22 and 24 are each connected to a separate positive electrode of discharge control 42 whose function is to maintain an equal discharge current in both discharge regions, i.e. a first region defined between cathode 20 and anode 22 and a second region defined between cathode 20 and anode 24, in order to minimize deviations of the indicated rotation rate due to the Fresnel-Fizeau effect, as is known in the art.

The laser beam thus generated includes counter-propagating beam components of a predetermined mode of electromagnetic energy. The image rotation imparted to the counter-propagating beam components by the non-planar path provides a reciprocal (direction-independent) circular birefringence which results in a frequency splitting of the selected mode into two circularly polarized mode component pairs. Referring now to FIG. 4, a first pair, comprising clockwise and counterclockwise mode components $f_1$ and $f_2$ which are, for instance, left-hand circularly polarized (LCP), is separated in frequency from a second pair, comprising counterclockwise and clockwise mode components $f_3$ and $f_4$ which are right-hand circularly polarized (RCP). A Faraday rotator 36 is placed in one of the passages, here shown as passage 16, to provide a nonreciprocal (direction-dependent) polarization rotation to produce a frequency splitting between counter-propagating components in each of the pairs, for instance, between $f_1$ and $f_2$ in the LCP pair, and $f_3$ and $f_4$ in the RCP pair. This is usually referred to as the Faraday bias. A more detailed description of such a circularly polarized gyro using a non-planar path may be found in U.S. Pat. No. 4,110,045. Alternatively, the Zeeman effect may be used to provide the direction-dependent polarization rotation. This is achieved by providing a magnetic field having a component along the optic axis within the gain medium in the discharge region. A more detailed description of a gyro using the Zeeman splitting as the means from producing the Faraday bias may be found in U.S. Pat. No. 4,229,106, issued Oct. 21, 1980, to Dorschner et al., and assigned to the present assignee. As a third alternative, in place of Faraday rotator 36, mirror 31 may be formed on a magnetized layer, such as manganese bismuth, in which the magnetic field is made perpendicular to the plane of incidence in order to provide the requisite direction-dependent polarization rotation. A more detailed description of magnetic mirrors may be found in U.S. patent application Ser. No. 257,303 filed on Apr. 23, 1981 by Herman Statz et al. and assigned to the present assignee.

One of the mirrors, for instance mirror 32, is made partially transmitting in order to extract the modes circulating in path 12. Output optics 50 is formed on output mirror 32 and is used to combine the counter-propagating mode components and isolate each polarization on separate diodes, shown as diodes 50a and 50b in FIG. 1, in order to detect the beat frequencies between the counterpropagating mode components for each polarization, i.e. ($f_2$-$f_1$) and ($f_4$-$f_3$). The two resulting signals are preamplified in preamp 52 before being fed to signal processor 54 where an output signal indicative of the rotation rate is generated, for instance, by subtracting one beat frequency from the other to remove the Faraday bias. The output signal thus generated is then coupled to utilization device 56, which may include a visual display or other operator interface. A more detailed description of suitable output optics 50 may be found in U.S. Pat. No. 4,141,651, issued Feb. 27, 1979 to Smith et al. and assigned to the present assignee.

Cathode 20 comprises a substantially spherical conductive envelope of a material suitable for the generation of free electrons. Cathode 20 is hermetically sealed to the center of one of tee faces of cube 18 adjacent passage 15. Cathode 20 is coupled to ring path 12 through auxiliary passage 60 which is drilled to intersect passage 15.

Anodes 22 and 24 each comprise a conductive electrode coupled to ring path 12 through auxiliary passages 61 and 62, respectively, drilled to intersect passages 14 and 16. The ends of electrodes 22 and 24 do not intersect passages 14 and 16, and stop a short distance therefrom. Electrodes 22 and 24 are held in place by seals 23 and 25 which prevent leaks in the gain medium. The diameter of the inactive region of the passages, that is, the portion of passages 13, 14 and 16 between electrodes 22 and 24 on the opposite side from cathode 20, is of a size larger than the diameter of the active region, that is the portion of passages between the two electrodes 22 and 24 and cathode 20, mainly to ease machining tolerances and to reduce diffraction losses of the circulating beams.

The tetrahedral ring is a particular skew rhombus ring which has its four mirrors at the vertices of a regular tetrahedron. A skew rhombus ring is a nonplanar ring having four equal sides. Skew rhombus rings can be generated by folding planar rhombus rings about a diagonal axis. The resultant rings have, in addition to four equal sides, opposite angles equal in pairs. The sensitive axis for a skew rhombus ring laser gyro bisects the dihedral angle between the two planes in which the ring lies. Just as for a planar gyro, the non-planar ring is insensitive to rotations about axes orthogonal to the sensitive axis. That special case of skew rhombus herein referred to as the tetrahedral ring is a regular skew quadrilateral which has four equal angles as well as four equal sides. The four mirrors, 30, 31, 32 and 33, are placed at the next nearest neighboring vertices of the cube 18. The beam path defined by passages 13 through 16 lies everywhere adjacent to the faces of the cube: The passages 13 through 16 are equidistant from the outer surface of block 18. This is achieved by cutting off these next nearest neighboring corners of cube block 18 at angles such that each of the resulting mirror planes has a normal which is in the plane of the two passages incident thereon and which bisects the angle formed therebetween.

Figure 2:
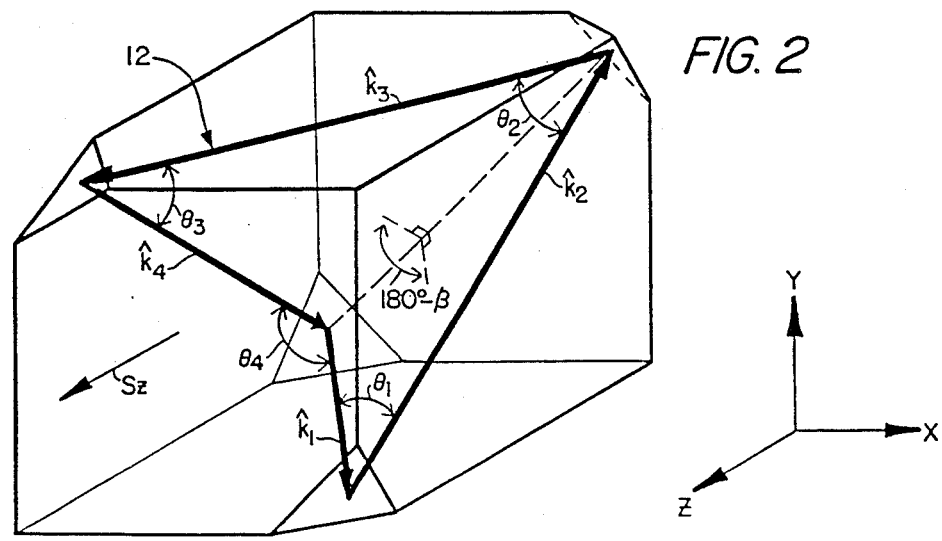
FIG. 2 is a simplified representation of the gyro block of FIG. 1, showing the cube support block and four vectors representing the ring path.

Referring now to FIG. 2, the unit wave vectors $\hat{k}_i$ of the ring are, starting at the vertex defined in FIG. 1 by mirror 31 and continuing in a clockwise sense about the z axis:

$$(1, 0, 1) = \sqrt{2}\ \hat{k}_1,$$

$$(0, 1, -1) = \sqrt{2}\ \hat{k}_2,$$

$$(-1, 0, 1) = \sqrt{2}\ \hat{k}_3,$$

and $$(0, -1, -1) = \sqrt{2}\ \hat{k}_4.$$

In general, the angle of incidence $\theta_i$ on the $i^{th}$ mirror is given by $$\cos(2\theta_1) = -\hat{k}_i \cdot \hat{k}_{i+1}$$

where i is an integer from 1 to 4 representing the mirror number and $\hat{k}_5$ is taken to be $\hat{k}_1$. For the tetrahedral ring shown, the angle of incidence on each mirror is equal to 30 degrees.

The unit mirror normals $n_i$ are given by $$\hat{n}_i = \frac{\hat{k}_{i+1} - \hat{k}_i}{|\hat{k}_{i+1} - \hat{k}_i|}$$

The four wave vectors and the four mirror normals can be generated from a single wave vector or mirror normal by 90 degree rotations about the normals of the cube faces. This means that only one setup is needed to drill all four bore holes and likewise only one setup to grind all four mirror faces. The cube need be simply indexed by 90 degree increments on an appropriate fixture. This is cost effective for fabrication.

It is also cost effective to have all four mirrors at the same angle of incidence. This reduces the required inventory of mirrors and increases the flexibility of mirror configurations: Any mirror can be used at any vertex. It is advantageous that the angle of incidence be fairly low for reasons of polarization maintenance upon transmission through the output mirror.

There are also performance advantages to having all of the incident angles be as small as possible, consistent of course with other gyro design constraints. The depolarized component of light backscattered from typical dielectric mirrors has been found experimentally to depend strongly on angle of incidence. It is this depolarized component that couples to the counter-travelling wave of adjacent frequency and gives rise to the so-called scatter induced bias drift a source of temperature sensitivity for all laser gyros. The coupling coefficient for this depolarized backscatter has been found experimentally to vary as about the 4.8 power of incidence angle.

The image rotation $\rho$ for a skew rhombus ring is given by the relation:

$$\sin \rho/4 = \tan \theta_1 \tan \theta_2$$

and for a tetrahedral ring this yields approximately 77.885 degrees of rotation. As the image rotation of a ring approaches any multiple of $\pi$, it becomes difficult to maintain circular polarization purity given any finite residual phase birefringence. An image rotation of 90 degrees is optimal for circular polarization purity. The reciprocal frequency splitting of the RCP and LCP modes of, a given longitudinal mode number is proportional to the image rotation. In a tetrahedral four-frequency RLG it will be about 87% of that for a similar ring having 90 degrees of image rotation. On the other hand, polarizations corresponding to different longitudinal mode numbers will exhibit about 113% of the usual splitting, and will therefore be readily identifiable. This may be advantageous for applications of highest accuracy wherein the slightly different scale factors of adjacent longitudinal modes could give rise to errors.

The fold angle $\beta$ is the angle by which the ring is folded out of plane. For a skew rhombus ring, $\beta$ is specified by the relation:

$$\cos(\beta/2) = \sec \theta_1 \sin \theta_2$$

and for a tetrahedral ring this yields $\beta = 109.471$ degrees. This is, of course, just the dihedral angle between any two faces of a regular tetrahedron.

The sensitive axis bisects the dihedral angle between the two planes of any skew rhombus ring. The sensitive axis for a skew rhombus, or any other nonplanar quadrilateral, is found to be perpendicular to the plane defined by the midpoints of the path segments. For the case of the tetrahedral ring shown in FIG. 2, the sensitive axis $S_z$ is along one of three orthogonal directions, here shown the z-axis. The cube can be rotated about any of its natural symmetry axes to generate equivalent rings with sensitive axes along any of the three cartesian directions. It is convenient to have the sensitive axes parallel to cube axes; i.e. normal to cube faces. This facilitates alignment and stacking to achieve multiple-axis configurations.

The four-frequency scale factor (SF) for a skew rhombus ring is given by the relation:

$$SF = 4(L/\lambda)\sin \theta_1 \sin \theta_2 \text{ (pulses/rad)},$$

where L is the length of one ring leg and lambda is the wavelength. For a tetrahedral ring in a scale factor is $SF = 2a/\lambda$ whereas is the cube side. This corresponds to an inverse scale factor of about 3.63 arc seconds per pulse for a one inch cube. A tetrahedral ring of 25-cm pathlength would have an inverse scale factor of about 2.09 arc seconds per pulse.

Another case of skew rhombus rings is that for which the fold angle $\beta$ is 90°; such rings are here referred to as orthohedral rings (i.e. rings having path segments disposed on orthogonal planes). An orthohedral ring may be configured on a cube as shown in FIG. 5. Two of the mirrors are placed at corresponding vertices of the cube on planes of form $\{1,1,1\}$, and remaining two mirrors are placed on two of the existing $\{'1,0,0\}$ ( faces of the cube. The sensitive axis is along the $\{1,-1,0\}$ direction, as indicated by the arrow. The image rotation of such a ring is 96.38°. Other image rotations can be synthesized by altering the spacing between the $\{1,1,1\}$ mirrors For instance, the image rotation could be made equal to 90° by moving those two $\{1,1,1\}$ closer together yielding incident angles of 40.06° and 24.47°. The scale factor SF is given for the case of 96.38° image rotation by the relation $SF = 1.26 (a/\lambda)$, and therefore gives about 12% less sensitivity to rotations than for the tetrahedral ring. However, scale factor is not itself a critical parameter; for most applications the scale factor of the tetrahedral ring is as practical as that of the above-mentioned orthohedral cube ring and of a 25-cm pathlength ring similar in shape to that shown in U.S. Pat. No. 4,284,329, issued Aug. 18, 1981, to Smith et al. and assigned to the present assignee.

The tetrahedral ring has the largest possible pathlength for any skew rhombus configured in a cube. It therefore offers maximal available gain for a given cube size. This is advantageous for miniature gyros. The pathlength for a tetrahedral ring is just $4\sqrt{2}$ a where a is the cube side length. By way of comparison, the largest square planar ring in such a cube has only $1/(\sqrt{2})$, or about 71%, of this pathlength. An orthohedral skew rhombus ring in such a cube can have no more than $\sqrt{\frac{5}{8}}$, or about 79%, of this pathlength.

It is useful to compare the relative packing densities of the tetrahedral ring, the orthohedral ring, and a ring design such as that shown in U.S. Pat. No. 4,284,329, at constant pathlength. The following table summarizes the size/volume advantages of the tetrahedral rings for the case of 25-cm pathlength rings. The minimal cube side and volume listed are those corresponding to infinitesimal mirror mounting surfaces. In practice, about 15 percent extra cube side length may be needed to ensure sufficient area for mirror mounting surfaces. The cube sides and volumes for a 15 percent larger cube are listed as the "practical" entries. Ring laser gyros which do not require pathlength control mirrors require less mirror mounting area and can therefore be designed to nest in even slightly smaller cubes.

| SIZE-VOLUME ADVANTAGES OF TETRAHEDRAL RINGS | | | |
|---|---|---|---|
| | Typical Non-Planar Ring | Orthohedral Ring | Tetrahedral Ring |
| Pathlength (cm) | 25 | 25 | 25 |
| Minimal Cube Side (in) | N/A | 2.20 | 1.74 |
| Minimal Cube Volume (cu in) | N/A | 10.65 | 5.27 |
| Practical Cube Side (in) | N/A | 2.53 | 2.00 |
| Practical Volume (cu in) | 15.2 | 16.19 | 8.01 |

The packing density of the tetrahedral ring is significantly superior to that of the alternative designs. For equal pathlengths, a tetrahedral ring occupies only about one-half the volume of the presently available typical design, whereas a right-angle cube ring occupies essentially the same volume.

The tetrahedral ring can be modified slightly to give 90 degree image rotation while maintaining the regular (equiangular) skew rhombus shape. It is only necessary to reduce the fold angle to 103.57 degrees. This corresponds to incident angles of 31.74 degrees which in turn results in 90-degree image rotation. The resultant mirror normals then differ slightly from the vectors for a perfect tetrahedral ring but remain all equivalent. The four passages would deviate slightly from the cube faces, but also would remain equivalent.

It is instructive to compare square planar rings with the tetrahedral rings. For a square planar ring, the mirrors are mounted at the midpoints of the cube edges. A square ring requires approximately $2\sqrt{2}=2.83$ times the volume of ring a tetrahedral ring of equal pathlength.

The tetrahedral ring has two orthogonal planes of symmetry. If this symmetry is maintained, it has important implications for the allowed beam motions and the resulting gyro performance. Symmetry can be maintained under uniform expansion if no pathlength control is used. Use of no pathlength control is of interest for high-accuracy temperature controlled gyros.

If no pathlength control is used, any ring will retain its original shape under the influence of uniform expansion. In this case there is no relative beam motion, either on the mirrors or within the bores. Specifically, the lack of relative beam motion results in a substantially constant backscatter level, thus reducing the drift in the rotation-indicating output signal which normally arises from variations in the net scatter level.

Operation of the gyro with no pathlength control is particularly useful in those applications in which mode shifts due to changing pathlength can be tolerated, as, for instance, in those applications encountering a small predetermined range of operating temperatures.

Referring now to FIG. 3, there is shown the tetrahedral ring laser gyro of FIG. 1 modified to include one pathlength control (PLC) mirror, here shown as mirror 33. Supporting mirror 33 there is shown piezoelectric actuator 133, whose function is, under control from pathlength control 70, to position mirror 33 so as to maintain a predetermined constant pathlength. This is accomplished by a feedback network which uses the D.C. signal components available at preamplifier 52 which indicate the relative intensities of the circularly polarized mode components pairs. These D.C. signals are coupled to pathlength control 70 which produces an appropriate error signal as a function of the difference of their relative intensities. This is done to maintain the mode components corresponding to the two circularly polarized pairs symmetrically within the bandwidth of the gain medium as shown in FIG. 4. The error signal produced by pathlength control 70 is then applied to piezoelectric driver 75 to produce a voltage signal which is applied to PZT actuator 133. The voltage applied causes a corresponding contraction or expansion of PZT actuator 133 which moves mirror 33 to a corresponding position that compensates for any change in pathlength. A more detailed description of pathlength control is found in U.S. Pat. No. 4,108,553, issued Aug. 22, 1978 to Zampiello et al. and assigned to the present assignee.

Modifications to the described embodiments will be apparent to persons skilled in the art without departing from the spirit and scope of this invention. Accordingly, it is intended that this invention be not limited except as defined by the appended claims.

What is claimed is:

1. An optical system for the propagation of a beam of electromagnetic energy comprising:
    means for directing said beam of electromagnetic energy along an optical ring path, said optical ring path divided into equal length segments all lying in only two orthogonal planes, and
    wherein said optical ring path is arranged to provide circular birefringence to said beam.

2. In combination:
    a rectangular parallelepipedal supporting block; and
    means for producing a resonant ring path having a nominal length within said block, said resonant ring path producing means comprising four reflectors, two of said reflectors positioned on two verticies of a first edge of said block and the remaining two reflectors positioned substantially midway between the verticies of a second edge and a third edge of the block, said second and third edges each being adjacent and substantially parallel to the first edge,
    wherein said four reflectors provide a closed nonplanar path substantially along two contigous faces of said block.

3. The combination of claim 2 further comprising:
    means for generating counter-propagating beams of predetermined frequencies in said ring path.

4. The combination of claim 3 further comprising:
    means for generating an output signal as a function of the frequency difference between said counter-propagating beams.

5. The combination of claim 4 further comprising:
    means for maintaining the length of said path constant.

6. The optical system of claim 1 wherein the directing means comprises four reflectors.

* * * * *